(12) United States Patent
Shimotsu (10) Patent No.: US 7,986,861 B2
(45) Date of Patent: Jul. 26, 2011

(54) OPTICAL FIBER CONNECTOR AND ENDOSCOPE SYSTEM USING THE SAME

(75) Inventor: Shinichi Shimotsu, Kanagawa (JP)

(73) Assignee: Fujifilm Corporation (JP)

( * ) Notice: Subject to any disclaimer, the term of this patent is extended or adjusted under 35 U.S.C. 154(b) by 0 days.

(21) Appl. No.: 12/822,824

(22) Filed: Jun. 24, 2010

(65) Prior Publication Data

US 2010/0329609 A1    Dec. 30, 2010

(30) Foreign Application Priority Data

Jun. 25, 2009   (JP) .................................. 2009-151203

(51) Int. Cl.
*G02B 6/32*   (2006.01)

(52) U.S. Cl. .............. 385/33; 385/31; 385/39; 385/115; 385/116; 385/117

(58) Field of Classification Search ................ 385/15, 385/31, 33, 37, 115, 116, 117, 39
See application file for complete search history.

(56) References Cited

U.S. PATENT DOCUMENTS

| 6,542,665 | B2 |  | 4/2003 | Reed et al. |
| 6,904,197 | B2 | * | 6/2005 | Bhagavatula et al. .......... 385/31 |
| 7,333,702 | B2 |  | 2/2008 | Fujita et al. |
| 7,436,875 | B2 |  | 10/2008 | Miura |

* cited by examiner

*Primary Examiner* — Jennifer Doan
(74) *Attorney, Agent, or Firm* — Studebaker & Brackett PC; Donald R. Studebaker (57) ABSTRACT

An optical fiber connector has a first ferrule holding an end of a first optical fiber, a first fiber stub connected to the first ferrule, a second ferrule holding an end of a second optical fiber, and a second fiber stub connected to the second ferrule. The first fiber stub enlarges the beam diameter of light transmitted through the first optical fiber, and produces the collimated light. The second fiber stub reduces the beam diameter of the collimated light, and leads the converging light into the second optical fiber. The first and second fiber stubs are detachably connected inside a connection sleeve across a predetermined gap. First and second GI fibers contained in the first and second fiber stubs satisfy $L1 \geqq L2$ and $L1+L2 \cong \frac{1}{2}$ pitch, wherein L1 and L2 represent the lengths of the first and second GI fibers, and one pitch is a sinusoidal period of the light transmitted therethrough.

14 Claims, 6 Drawing Sheets

|  | CONNECTION LOSS (WAVELENGTH: 405 nm) | CONNECTION LOSS (WAVELENGTH: 635 nm) |
|---|---|---|
| SAMPLE A<br>LENGTH L1 OF FIRST GI FIBER: 4.62 mm<br>LENGTH L2 OF SECOND GI FIBER: 3.91 mm | 1.2 dB<br>(LOSS RATE 24%) | 0.9 dB<br>(LOSS RATE 18%) |
| SAMPLE B<br>LENGTH L1 OF FIRST GI FIBER: 4.62 mm<br>LENGTH L2 OF SECOND GI FIBER: 3.93 mm | 1.4 dB<br>(LOSS RATE 28%) | 1.1 dB<br>(LOSS RATE 22%) |

FIG. 4

POSITIONAL TOLERANCE IN Z-DIRECTION

FIG. 5

POSITIONAL TOLERANCE IN X- AND Y-DIRECTION

OPTICAL FIBER CONNECTOR AND ENDOSCOPE SYSTEM USING THE SAME

BACKGROUND OF THE INVENTION

1. Field of the Invention

The present invention relates to a detachable optical fiber connector and an endoscope system using this connector, and more specifically relates to the optical fiber connector that is suitable for transmission of high power laser light and the endoscope system using the same.

2. Description Related to the Prior Art

Physical contact connection (hereinafter called PC connection) is known as a method for connecting optical fibers, in which ends of the optical fibers tightly make contact with each other. In the PC connection, an end portion of each optical fiber is inserted into and fixed in a cylindrical ferrule, and an end face of each optical fiber is polished into a convex spherical shape together with an end face of the ferrule. The ferrules with the optical fibers are inserted into both ends of a cylindrical sleeve, so that the polished end faces of the ferrules make contact with each other in the sleeve. Thus, the optical fibers exposed from the end faces of the ferrules directly and tightly make contact with each other in the sleeve.

In an endoscope system for imaging the inside of a human body, a fiber bundle, which is composed of a plurality of optical fibers tied together, is used as a light guide to transmit light from a light source unit to the inside of the body. The light guide is routed through a flexible insert section of an endoscope, which is introduced into the human body, and a universal cord for connecting the endoscope to the light source unit. An end of the light guide is connected to a lighting window provided in a distal end of the insert section. The other end of the light guide is connected to the light source unit via a connector provided on an end of the universal cord.

Since the connector is often detached from the light source unit, a tip of the connector tends to be dusty. Besides, the often detachment can cause damage to the end face of the light guide provided in the connector. If a connection section of the optical fibers becomes dusty or flawed, a connection loss of light transmitted through the optical fibers is increased. In addition, in a case where the end of the optical fiber has high optical power density, a dust particle or the flaw can catch fire, and the end of the optical fiber and the end of the ferrule can be burnt. Otherwise, the fire can spread over the optical fiber by a fiber fuse phenomenon.

To prevent the burn of the optical fiber due to the dust particle or the like, there is proposed an optical fiber connector that has low optical power density at the connection section. According to U.S. Pat. Nos. 7,333,702 and 6,542,665, for example, a graded-index fiber that functions as a collimator lens is fusion spliced to an end of a single-mode fiber, in order to enlarge a mode field diameter.

By the way, it is considered to use a laser light source unit in the endoscope system. Laser light with a short wavelength and high power outputted from the laser light source unit is guided through the light guide to a phosphor provided at the distal end of the insert section. The laser light excites the phosphor to obtain illumination light. In such a light guide for transmitting the laser light, a single strand of multimode fiber having a core diameter of, for example, 100 μm or more is used, instead of the optical fiber bundle. The use of the multimode fiber contributes reduction in the diameter of the insert section.

It is known that a phenomenon called dust collection effect occurs at a light transmission section with high optical power density, when the optical fiber transmits the high power laser light. The dust collection effect is a phenomenon in which the laser light photochemically reacts with vaporized organic substances and forms other substances, and the formed substances are deposited. The multimode fiber has a larger core diameter than a general single-mode fiber. Thus, it is difficult for the multimode fibers to precisely contact end faces of cores with each other by the PC connection. Consequently, apart of the end face of the core with high optical power density is exposed to the air, and the dust collection effect tends to occur there. The dust collection effect occurring in the optical fiber causes increase in the connection loss, as with the dust particle, and can result in the burn of the optical fiber or the fiber fuse phenomenon.

When the connected optical fibers transmit the high power laser light, there is a case where oxide (such as quartz and $SIO_2$) contained in the optical fibers reacts with the laser light, and ends of the optical fibers adhere to each other in the PC connection section. It is known that this adhesion phenomenon is likely to occur, when the ends of the optical fibers or the ends of the ferrules are connected by the PC connection after UV cleaning. If the optical fibers adhere to each other in the connector of the endoscope system, the ends of the optical fibers will break upon detaching the connector from the laser light source unit. If the break occurs, the ends of the optical fibers require re-polishing with the ferrules, and hence repair becomes a big deal.

The adverse phenomena including the dust collection effect and the adhesion can be prevented by reducing the optical power density at the PC connection section with use of the graded-index fibers, as described in the U.S. Pat. Nos. 7,333,702 and 6,542,665. These prior arts, however, are intended for the single-mode fibers that transmit light of a long wavelength for communications. Accordingly, the optical fibers are different from those used in the endoscope system in type, a core diameter and the like, and hence the prior arts are not applicable to the optical fibers of the endoscope system.

Furthermore, light incident upon the graded-index fiber (GI fiber) is transmitted therethrough with traveling an optical path of a sine wave. The sine wave has a specific period in accordance with a refractive index profile of the GI fiber. When one pitch refers to one period of the sine wave, the GI fiber used as the collimator lens has to have a length of $\frac{1}{4} \times (2n-1)$ $(n=1, 2, \ldots)$ pitch. However, since both ends of the GI fiber is polished before connection to the optical fiber, the GI fiber is difficult to precisely process into a desired length and this causes a low yield rate. Placing importance on cost, if the GI fibers of various lengths are used, collimation properties become unstable from product to product. In addition, even if the GI fiber can be processed into the desired length, variations in a refraction index in a longitudinal direction may cause poor collimation properties of the connector.

SUMMARY OF THE INVENTION

A main object of the present invention is to increase a yield rate of a graded-index fiber used as a collimator lens.

Another object of the present invention is to provide an optical fiber connector having stable collimation properties.

An optical fiber connector according to the present invention has a first graded-index fiber detachably attached to a light exit end of a first optical fiber, and a second graded-index fiber detachably attached to a light entry end of a second optical fiber. The first graded-index fiber enlarges the beam diameter of light incident from the first optical fiber, and produces the collimated light. The second graded-index fiber reduces the beam diameter of the collimated light incident from the first graded-index fiber, and leads the converging light into the second optical fiber. The first and second graded-index fibers satisfy the following expressions:

$$L1 \geq L2$$

$$L1+L2 \cong \tfrac{1}{2} \text{ pitch}$$

wherein, L1 represents the length of the first graded-index fiber, L2 represents the length of the second graded-index fiber, and one pitch represents a single sinusoidal period of an optical path of the light transmitted through the first graded-index fiber.

It is preferable that each of the first and second optical fibers be a multimode fiber having a core diameter of 100 μm or more, and transmit the light having an optical power of 100 mW or more.

It is preferable that the first and second graded-index fibers be disposed so as to align central axes of cores with each other across a predetermined gap. The predetermined gap is preferably 50 μm or more.

The first and second graded-index fibers may further satisfy the following expression:

$$L1 \times 0.7 \leq L2 \leq L1$$

It is preferable that the light contains at least one wavelength component between 405 nm and 635 nm inclusive. It is preferable that a core diameter of the first graded-index fiber be three or more times larger than that of the first optical fiber, and a core diameter of the second graded-index fiber be equal to or larger than that of the first graded-index fiber.

The first and second graded-index fibers may further satisfy the following expressions:

$$3 \text{ mm} \leq L1 \leq 10 \text{ mm}$$

$$3 \text{ mm} \leq L2 \leq 10 \text{ mm}$$

The optical fiber connector may further include a first anti-reflection film disposed at a light exit end of the first graded-index fiber, and a second anti-reflection film disposed at a light entry end of the second graded-index fiber. The first anti-reflection film has a topmost layer containing fluoride, and the second anti-reflection film has a topmost layer containing fluoride.

The optical fiber connector may further include a first fluoride film disposed at a light entry end of the first graded-index fiber, and a second fluoride film disposed at a light exit end of the second graded-index fiber.

The optical fiber connector may further include a first ferrule attached to an end portion of the first optical fiber, a second ferrule attached to an end portion of the second optical fiber, a third ferrule for covering the first graded-index fiber, and a fourth ferrule for covering the second graded-index fiber, a first sleeve, a second sleeve, and a connection sleeve. The light exit end of the first optical fiber is exposed from an end of the first ferrule. The light entry end of the second optical fiber is exposed from an end of the second ferrule. The light entry end of the first graded-index fiber is exposed from an end of the third ferrule, and the light exit end of the first graded-index fiber is exposed from the other end of the third ferrule. The light entry end of the second graded-index fiber is exposed from an end of the fourth ferrule, and the light exit end of the second graded-index fiber is exposed from the other end of the fourth ferrule. The first sleeve holds the first ferrule and the third ferrule so that the light exit end of the first optical fiber keeps contact with the light entry end of the first graded-index fiber. The second sleeve holds the second ferrule and the fourth ferrule so that the light entry end of the second optical fiber keeps contact with the light exit end of the second graded-index fiber. The connection sleeve holds the third ferrule and the fourth ferrule so that the light exit end of the first graded-index fiber concentrically faces to the light entry end of the second graded-index fiber across a predetermined gap.

An endoscope system according to the present invention includes an endoscope having a slender insertion section, a light source unit, and the optical fiber connector described above. Through the insertion section of the endoscope, a light exit side optical fiber is routed to transmit light for lighting an object to be imaged. The light source unit has a light source for emitting the light, and a light entry side optical fiber for transmitting the light from the light source. The optical fiber connector connects a light exit end of the light entry side optical fiber to a light entry end of the light exit side optical fiber.

According to the present invention, a combination of the graded-index fibers that have different lengths from each other composes a collimator lens, and hence results in increase in a yield rate and cost reduction. Since the light has a slightly converging beam diameter when exiting from the first graded-index fiber, a connection loss between the first and second graded index fibers is reduced.

BRIEF DESCRIPTION OF THE DRAWINGS

For more complete understanding of the present invention, and the advantage thereof, reference is now made to the following descriptions taken in conjunction with the accompanying drawings, in which.

DESCRIPTION OF THE PREFERRED EMBODIMENTS

Figure 1:
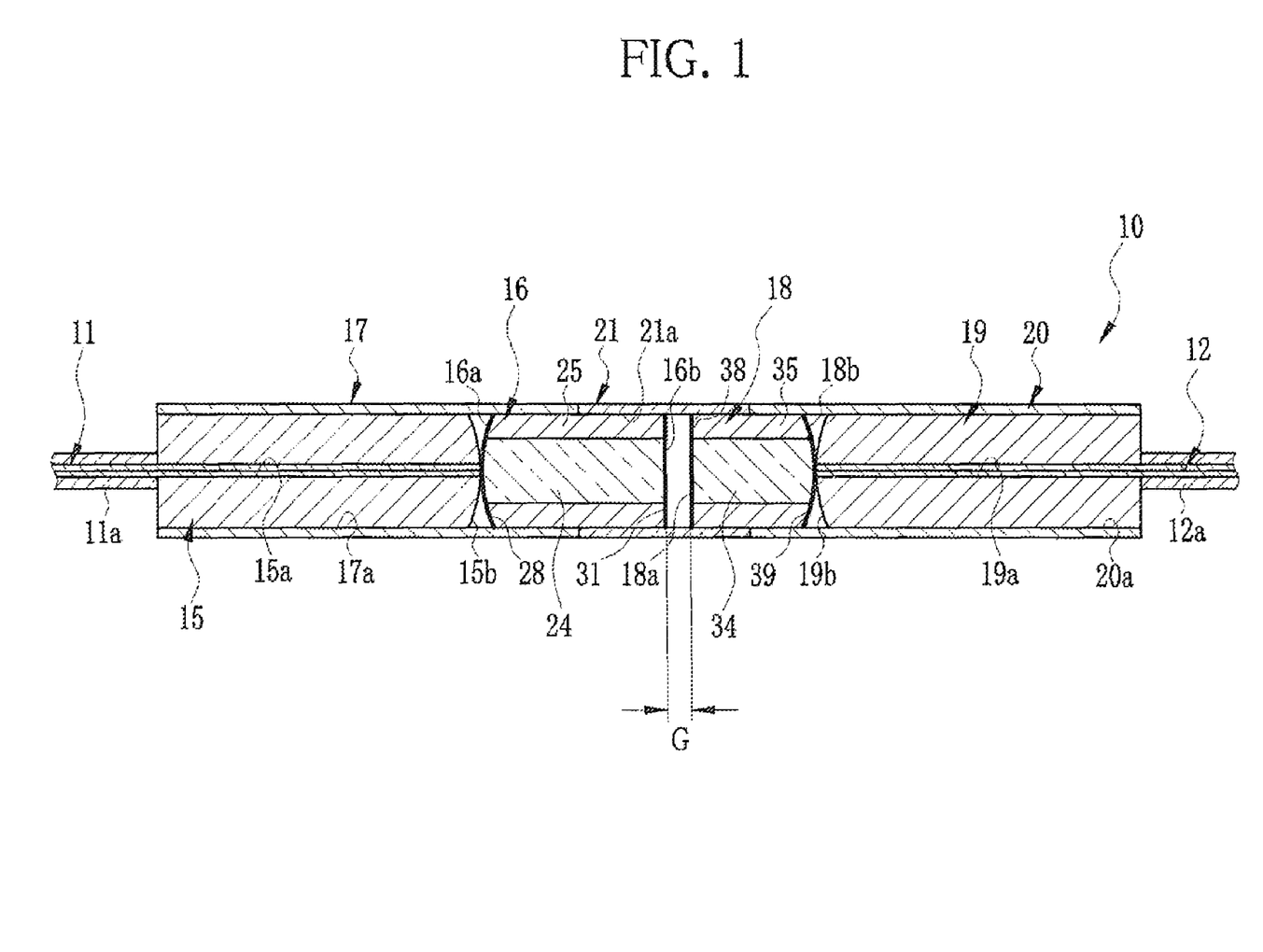
FIG. 1 is a longitudinal sectional view of an optical fiber connector.

FIG. 1 shows an optical fiber connector 10 that connects a first optical fiber 11 to a second optical fiber 12. The first and second optical fibers 11 and 12 are multimode fibers that are made of quartz and have a core diameter of 100 μm or more, for example. Laser light having a short wavelength of 405 to 635 nm and a high power of 100 mW or more is transmitted from the first optical fiber 11 to the second optical fiber 12. According to a transmission direction of the laser light, a right side of FIG. 1 is referred to as a front side (distal), and a left side is referred to as a rear side (proximal).

The optical fiber connector 10 is constituted of a first ferrule 15 for holding a front end portion of the first optical fiber 11, a first fiber stub 16 detachably connected to the first ferrule 15, a first sleeve 17 for holding the first ferrule 15 and the first fiber stub 16, a second ferrule 19 for holding a rear end portion of the second optical fiber 12, a second fiber stub 18 detachably connected to the second ferrule 19, a second sleeve 20 for holding the second ferrule 19 and the second fiber stub 18, and a connection sleeve 21. The first fiber stub 16 enlarges the beam diameter of the laser light transmitted through the first optical fiber 11, and produces collimated light. The second fiber stub 18 converges the collimated light incident from the first fiber stub 16, and transmits the light to the second optical fiber 12. The first fiber stub 16 and the second fiber stub 18 are detachably connected to each other in the connection sleeve 21. Pulling one or both of the first fiber stub 16 and the second fiber stub 18 from the connection sleeve 21 disconnects the optical fiber connector 10.

The first ferrule 15 is in a cylindrical shape, and has a fiber insertion hole 15a penetrating at the center thereof along an axial direction. After stripping off a jacket 11a, the front end portion of the first optical fiber 11 is inserted into the fiber insertion hole 15a, and is fixed therein with an adhesive. A front end 15b of the first ferrule 15 is polished in a convex peripheral shape or a flat shape together with a front end of the first optical fiber 11, which is exposed from the fiber insertion hole 15a.

The first fiber stub 16 is provided with a first graded-index fiber (hereinafter called first GI fiber) 24 that functions as a collimator lens, and a cylindrical third ferrule 25 for covering the first GI fiber 24. A rear end (light entry end) of the first GI fiber 24 is exposed from a rear end 16a of the first fiber stub 16. A front end (light exit end) of the first GI fiber 24 is exposed from a front end 16b of the first fiber stub 16. A rear end face of the first GI fiber 24 is polished into a convex spherical shape, together with a rear end face of the third ferrule 25. A front end face of the first GI fiber 24 is polished into a flat shape, together with a front end face of the third ferrule 25. A combination of the polished shapes between the rear end 16a and the front end 16b may be any of convex spherical-convex spherical, flat-convex spherical, convex spherical-flat, and flat-flat. The rear end 16a of the first fiber stub 16 makes contact with the front end 15b of the first ferrule 15, so that the first GI fiber 24 is connected to the first optical fiber 11 by physical contact connection (PC connection).

Since the first GI fiber 24 has a larger core diameter than the first optical fiber 11, the first optical fiber 11 is connected to the first GI fiber 24 without the front end of the first optical fiber 11 being exposed to the air. Thus, a dust collection effect does not occur at the front end of the first optical fiber 11. In order to keep the favorable PC connection between the first optical fiber 11 and the first GI fiber 24, it is preferable to provide a mechanism including a bias member like a spring to press one of the first ferrule 15 and the first fiber stub 16 against the other. In PC connection of optical fibers having a core diameter of 100 μm or more, in general, contact surfaces preferably take the shapes of flat-convex spherical or flat-flat, rather than convex spherical-convex spherical, for the purpose of increasing the size of the contact surfaces and preventing pollution.

The first GI fiber 24 enlarges the beam diameter of the laser light transmitted through the first optical fiber 11, and produces the collimated light. Thus, the optical power density of the laser light at the front end 16b of the first fiber stub 16 is lower than that at the front end of the first optical fiber 11. Therefore, even if the front end 16b of the first fiber stub 16 is dusty or flawed, a connection loss does not become so high. There is neither a burn of the first fiber stub 16 due to overheat of a dust particle adhering to the front end 16b, nor the spread of the overheat to the first optical fiber 11 by a fiber fuse phenomenon. Furthermore, reduction in the optical power density prevents the occurrence of a photochemical reaction between the laser light and a vaporized organic substance, and hence prevents the occurrence of a dust collection effect at the front end 16b of the first fiber stub 16.

It is known that an optical power density of 15 W/mm² or less can sufficiently prevent the occurrence of the dust collection effect (refer to U.S. Pat. No. 7,436,875, for example). Thus, in this embodiment, the optical power density at the front end 16b is preferably lowered to 15 W/mm² or less.

The rear end 16a of the first fiber stub 16 is provided with a fluoride film 28. Thus, the connection of the first optical fiber 11 to the first GI fiber 24 through the fluoride film 28 prevents the occurrence of an adhesion phenomenon, in which when the optical fibers are directly connected by the PC connection, a PC connection area adheres to each other.

The front end 16b of the first fiber stub 16 is provided with an anti-reflection film 31 to reduce a reflective loss of the laser light. The topmost layer in the anti-reflection film 31 is a fluoride layer. Thus, it is possible to easily remove the dust particle from the front end 16b of the first fiber stub 16 and a contaminant that has piled up thereon by the dust collection effect.

The first sleeve 17 is a sleeve generally called split sleeve, and takes the shape of a cylinder having a ferrule insertion hole 17a at the center thereof. An inside diameter of the ferrule insertion hole 17a is slightly smaller than the outside diameters of the first ferrule 15 and the first fiber stub 16. In the periphery of the first sleeve 17, a single slit (not illustrated) is provided along the axial direction to impart radial elasticity to the first sleeve 17.

The first ferrule 15 and the first fiber stub 16 are inserted into both ends of the ferrule insertion hole 17a of the first sleeve 17, and detachably held therein by the elasticity of the first sleeve 17. In the first sleeve 17, the front end 15b of the first ferrule 15 makes tightly contact with the rear end 16a of the first fiber stub 16.

The length of the first sleeve 17 is shorter than the sum length of the first ferrule 15 and the first fiber stub 16. Thus, when the rear end of the first ferrule 15 is set flush with the rear end of the first sleeve 17, the first fiber stub 16 protrudes by half from the front end of the first sleeve 17. The first sleeve 17 may be made of any material including metal, zirconia ceramic or the like.

The second fiber stub 18 is similar to the first fiber stub 16, and is provided with a second GI fiber 34 and a cylindrical fourth ferrule 35 for covering the second GI fiber 34. A rear end (light entry end) of the second GI fiber 34 is exposed from a rear end 18a of the second fiber stub 18, and a front end (light exit end) of the second GI fiber 34 is exposed from a front end 18b of the second fiber stub 18. The rear end 18a of the second fiber stub 18 is polished into a flat shape, and the front end 18b thereof is polished into a convex spherical shape. Although it will be described later in detail, the second fiber stub 18 is shorter than the first fiber stub 16, for the purpose of increasing a yield rate and reducing a connection loss.

The rear end 18a of the second fiber stub 18 is disposed in front of the front end 16b of the first fiber stub 16 across a predetermined gap G. The front end 18b of the second fiber stub 18 makes contact with a rear end 19b of the second ferrule 19, so as to connect the second GI fiber 34 to the second optical fiber 12 by the PC connection. As with the first fiber stub 16, the rear end 18a of the second fiber stub 18 is provided with an anti-reflection film 38, and the front end 18b thereof is provided with a fluoride film 39.

Since the front end 16b of the first fiber stub 16 and the rear end 18a of the second fiber stub 18 do not make contact with each other, if there is the dust particle therebetween, the dust particle does not become broken down with pressure. Also, in connecting or disconnecting the optical fiber connector 10, the front end 16b of the first fiber stub 16 and the rear end 18a of the second fiber stub 18 are not inappropriately rubbed or bumped, and results in the prevention of damage.

The second ferrule 19 has the same structure as the first ferrule 15, and holes the rear end of the second optical fiber 12. The rear end 19b of the second ferrule 19 is polished into a convex spherical shape (or flat shape), together with the rear end of the second optical fiber 12.

The second sleeve 20 has the same structure as the first sleeve 17. The second optical fiber 12 and the second GI fiber 34 are connected by the PC connection in the second sleeve 20. The second fiber stub 18 held by the second sleeve 20 protrudes by half from the rear end of the second sleeve 20.

The connection sleeve 21 is in the shape of a cylinder having a stub insertion hole 21a at the center thereof. The inside diameter of the stub insertion hole 21a is approximately the same as the outside diameter of the first fiber stub 16 and the second fiber stub 18. The first fiber stub 16 and the second fiber stub 18 are fitted into both ends of the stub insertion hole 21a of the connection sleeve 21. The connection sleeve 21 aligns the central axes of the first fiber stub 16 and the second fiber stub 18, and detachably connects the first fiber stub 16 and the second fiber stub 18. The connection sleeve 21 may be made of any material including metal, zirconia ceramic, or the like.

The length of the connection sleeve 21 is equal to the sum total of a protrusion amount of the first fiber stub 16 from the first sleeve 17, a protrusion amount of the second fiber stub 18 from the second sleeve 20, and the gap G between the first fiber stub 16 and the second fiber stub 18. Thus, when the first fiber stub 16 and the second fiber stub 18 are fitted into the connection sleeve 21, the rear end of the connection sleeve 21 contacts the first sleeve 17 and the front end of the connection sleeve 21 contacts the second sleeve 20, so as to regulate insertion amounts of the first fiber stub 16 and the second fiber stub 18 into the connection sleeve 21. As a result, the predetermined gap G is created between the first fiber stub 16 and the second fiber stub 18 inside the connection sleeve 21.

It is known that the size of the dust particle adhering to a tip of the optical fiber is 50 μm at the most. Accordingly, the gap G between the front end 16b of the first fiber stub 16 and the rear end 18a of the second fiber stub 18 has to be 50 μm or more to prevent the dust particle from breaking down with pressure. Also, in order to certainly keep the front end 16b of the first fiber stub 16 from contact with the rear end 18a of the second fiber stub 18, the gap G is preferably 1.0 to 2.0 mm in consideration of a manufacturing error, an assembly error, and the like of the optical fiber connector 10.

Next, the first GI fiber 24 and the second GI fiber 34 will be described in detail. As described above, the first optical fiber 11 and the second optical fiber 12 are the multimode fibers that have the larger core diameter than a general single-mode fiber for communications. Accordingly, to enlarge the beam diameter of the laser light transmitted through the first optical fiber 11 and to produce the collimated light for the purpose of preventing the occurrence of the dust collection effect and the burn, the core diameter of the first GI fiber 24 has to be at least three times larger than that of the first optical fiber 11, and preferably five times or more.

To converge the beam diameter enlarged by the first GI fiber 24 and to transmit the light to the second optical fiber 12, in a like manner, the core diameter of the second GI fiber 34 has to be at least the same as that of the first GI fiber 24, or larger. Accordingly, in this embodiment, the core diameter of the first GI fiber 24 is, for example, 300 μm or more, and preferably 500 μm or more. The core diameter of the second GI fiber 34 is equal to or larger than that of the first GI fiber 24.

Since a GI fiber has a large optical transmission loss of short wavelength light, it is preferable that the first and second GI fibers 24 and 34 be as short as possible. In addition, since the ends of the first and second GI fibers 24 and 34 are polished after being inserted into the third and fourth ferrules 25 and 35, respectively, the first and second GI fibers 24 and 34 have to have enough length for holding during polishing. From above viewpoints, the lengths of the first and second GI fibers 24 and 34 are set between, for example, 3 mm and 10 mm inclusive in this embodiment.

The laser light incident upon the GI fiber is transmitted through the GI fiber with a specific period of a sine wave. When one pitch refers to the single period of the sine wave, the GI fiber must have a length of ¼ pitch, to use the GI fiber as a collimator lens while minimizing the optical transmission loss. Therefore, it is preferable that the length of each of the first and second GI fibers 24 and 34 be between or equal to 3 mm and 10 mm, as described above, and ¼ pitch. In general, collimation properties can be obtained when the length of the GI fiber satisfies ¼×(2n−1) (n=1, 2, ... ) pitch. However, ¼ pitch is the most preferable from the viewpoint of minimizing the optical transmission loss.

Since the lengths of the first and second fiber stubs 16 and 18 are adjusted by polishing both end surfaces thereof, the lengths vary by approximately ±20%. Thus, if the correct lengths are required of the first and second fiber stubs 16 and 18, the yield rate is reduced and cost is increased. Besides, even if the GI fiber can be processed into the desired length, variations in a refraction index in a longitudinal direction may cause poor collimation properties.

Figure 2:
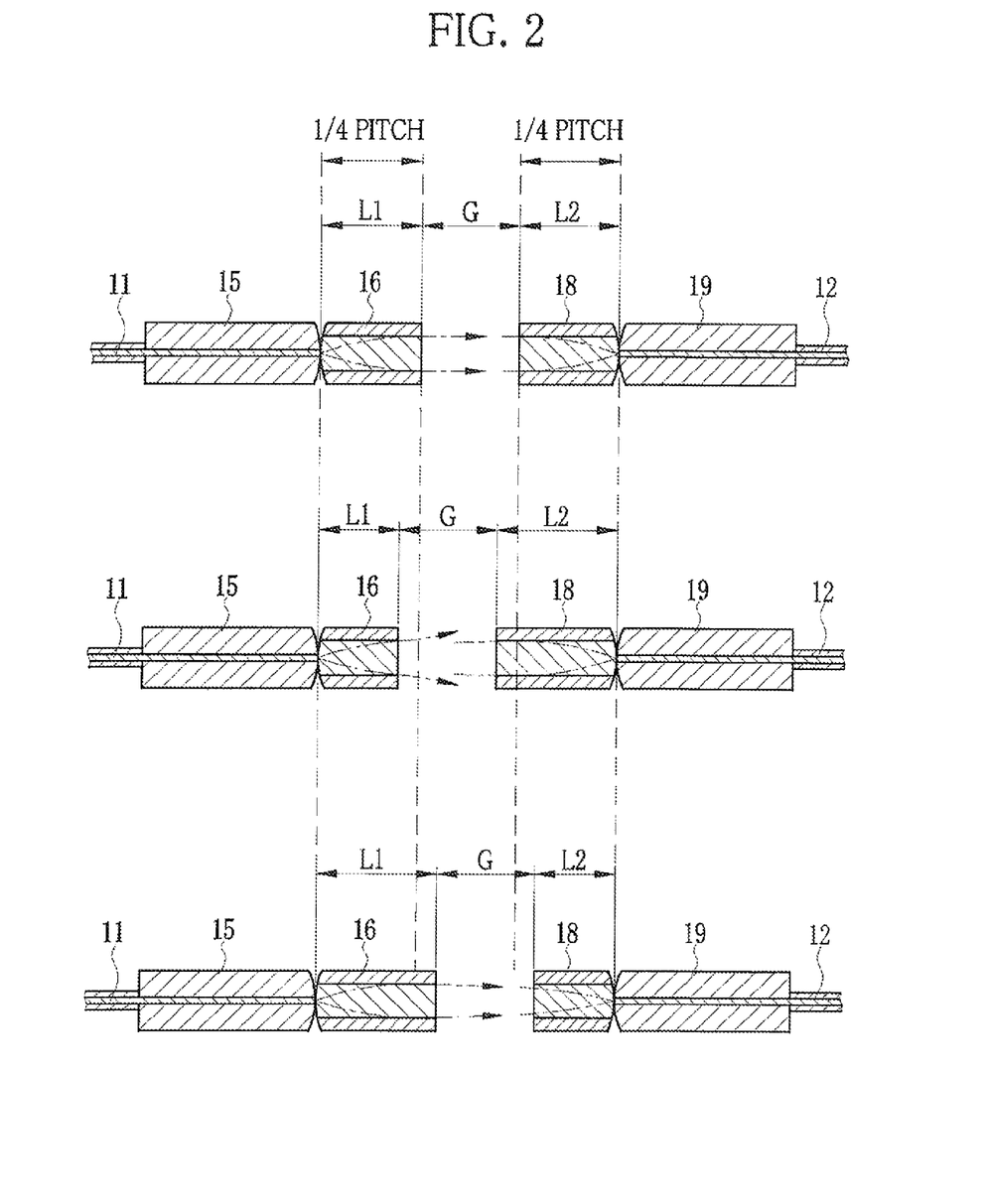
FIG. 2 is an explanatory view showing difference in a light transmission state in accordance with the lengths of a first fiber stub and a second fiber stub.

FIG. 2 schematically shows difference in a light transmission state according to variation in the lengths of the first and second fiber stubs 16 and 18. In FIG. 2, the gap G is illustrated wider for the purpose of clarifying the state of light transmitted from the first fiber stub 16 to the second fiber stub 18.

If the length L1 of the first fiber stub 16 and the length L2 of the second fiber stub 18 are equally ¼ pitch, as illustrated at the top of FIG. 2, the first fiber stub 16 enlarges the beam diameter and produces the collimated light. The collimated light is incident upon the second fiber stub 18 without producing a serious loss. The second fiber stub 18 converges and leads the light to the second optical fiber 12.

On the contrary, as shown in the middle of FIG. 2, if the length L1 of the first fiber stub 16 is shorter than ¼ pitch, and the length L2 of the second fiber stub 18 is longer than ¼ pitch, the so-called mode mismatch occurs, in which the beam diameter enlarged by the first fiber stub 16 becomes larger than the core diameter of the second fiber stub 18. This causes diffraction of light in the gap G, and increase in the connection loss. The connection loss due to the diffraction is reduced with reduction in the gap G between the first fiber stub 16 and the second fiber stub 18, but other problems such as internal presence of the dust particle and the occurrence of a flaw arise.

Considering above, in this embodiment, the lengths of the fiber stubs are measured in advance, and the appropriate fiber stubs are used in combination as the first and second fiber stubs 16 and 18, so that the sum total of the length L1 of the first fiber stub 16 and the length L2 of the second fiber stub 18 becomes ½ pitch, and the length L2 is shorter than the length L1, as shown in the bottom of FIG. 2. This way allows the use of the fiber stubs of various lengths in combination as the first and second fiber stubs 16 and 18, and results in increase in a yield rate and reduction in cost. Also, an exit of the light with converged beam diameter from the rear end 16b of the first fiber stub 16 brings about reduction in the connection loss. Since the sum total of the length L1 of the first fiber stub 16 and the length L2 of the second fiber stub 18 is constant (½ pitch), the length of the gap G becomes constant. The length L2 of the second fiber stub 18 may be less than the length L1 of the first fiber stub 16, instead of the length L1 or less.

Next, the operation of this embodiment will be described. The first fiber stub 16 is detachably connected to the front end of the first optical fiber 11 by the PC connection via the first ferrule 15 and the first sleeve 17. To the rear end of the second optical fiber 12, as with the first optical fiber 11, the second fiber stub 18 is detachably connected by the PC connection via the second ferrule 19 and the second sleeve 20.

In connecting the first optical fiber 11 to the second optical fiber 12, the first fiber stub 16 and the second fiber stub 18 are fitted into both ends of the connection sleeve 21. Inside the connection sleeve 21, the predetermined gap G is created between the first fiber stub 16 and the second fiber stub 18, because the first sleeve 17 contacts one end of the connection sleeve 21, and the second sleeve 20 contacts the other end thereof. Accordingly, the dust particle adhering to the first or second fiber stub 16 or 18 does not become broken with pressure, and a flaw does not occur in the first or second fiber stub 16 or 18 by inappropriate rub and bump thereof.

The first optical fiber 11 is connected to a laser module at a rear end, and transmits the laser light having the short wavelength of 405 to 635 nm and the high power of 100 mW or more, for example. The laser light transmitted through the first optical fiber 11 exits from the front end of the first optical fiber 11, and enters into the first GI fiber 24 in the first fiber stub 16. The first GI fiber 24 enlarges the beam diameter of the incident laser light, and produces the collimated light. The collimated light exits from the front end 16b of the first fiber stub 16, and enters the second fiber stub 18 across the gap G. The second fiber stub 18 converges the collimated light, and enters the converged light into the second optical fiber 12.

The first optical fiber 11 is connected to the first GI fiber 24 and the second optical fiber 12 is connected to the second GI fiber 34 by the PC connection, and the first and second GI fibers 24 and 34 have the larger core diameter than that of the first and second optical fibers 11 and 12. Thus, the front end of the first optical fiber 11 and the rear end of the second optical fiber 12 are not exposed to the air, and hence the dust collection effect does not occur. The rear end 16a of the first fiber stub 16 is provided with the fluoride film 28 that prevents the occurrence of the adhesion phenomenon between the first optical fiber 11 and the first GI fiber 24. In a like manner, the fluoride film 39 prevents the occurrence of the adhesion phenomenon between the second optical fiber 12 and the second GI fiber 34.

The dust particle or the like tends to adhere to the front end 16b of the first fiber stub 16 and the rear end 18a of the second fiber stub 18, while the optical fiber connector 10 is detached. The laser light exiting from the front end 16b of the first fiber stub 16 is collimated by the first GI fiber 24, and has the low optical power density. Thus, the connection loss is hardly increased, and the burn of the first or second fiber stub 16 or 18 does not occur due to a burn of the adhering dust particle.

Also, the occurrence of the dust collection effect is restrained. The front end 16b of the first fiber stub 16 and the rear end 18a of the second fiber stub 18 are provided with the anti-reflection film 31 and 38, respectively, each of which has the fluoride layer at the topmost layer, so that the adhering dust particle or the deposited contaminant is easily removable.

To disconnect the first optical fiber 11 from the second optical fiber 12, one or both of the first fiber stub 16 and the second fiber stub 18 are pulled out of the connection sleeve 21. Since the first and second fiber stubs 16 and 18 are disposed across the gap G, the adhesion phenomenon does not occur between the first and second fiber stubs 16 and 18, and the first or second fiber stub 16 or 18 is not damaged in disconnection.

In a case where the first fiber stub 16 is flawed or heavily degraded by the deposition of the contaminant, the used first fiber stub 16 is pulled out of the first sleeve 17, and is replaceable with new one. Accordingly, it is possible to easily make repairs on the optical fiber connector 10, and reduce cost. The second fiber stub 18 is replaceable in a like manner.

Since the optical axes of the first and second fiber stubs 16 and 18 coincide with those of the first and second optical fibers 11 and 12, the effect of chromatic aberration hardly appears. Accordingly, in the laser light with the wavelength of 405 nm (blue-violet) to 635 nm (red), a light loss hardly increases. Therefore, the optical fiber connector 10 according to the present invention is applicable to a system that uses light with a lot of wavelengths.

PRACTICAL EXAMPLES

A connection loss of the optical fiber connector 10 was evaluated. In the evaluation, using a state in which the first and second optical fibers 11 and 12 were directly connected as reference, the first and second fiber stubs 16 and 18 being targets of evaluation were disposed between the first and second optical fibers 11 and 12, and an increased loss was designated as the connection loss. In this evaluation, the positions of the first and second fiber stubs 16 and 18 were adjusted with use of the laser light of 405 nm on a stage, and the connection loss with the laser light of 635 nm was evaluated without changing the positions, in addition to the connection loss with the laser light of 405 nm. The reason why the positions of the first and second fiber stubs 16 and 18 were adjusted in accordance with the laser light of 405 nm was that an optical path of the laser light of 405 nm shrinks by 400 μm in an optical axis direction as compared with that of the laser light of 635 nm due to the effect of wavelength dispersion. Here are conditions on the loss evaluation.

[First and Second Optical Fibers]
   (Step index) multimode fibers
   Core diameter: 105 μm
   Clad diameter: 126 μm

[First and Second Ferrules]
   Zirconia ferrules having a diameter of 2.5 mm and a length of 10 mm

[First and Second Fiber Stubs]
   First and second GI fibers:
      Graded-index fibers (Ge doped core)
      Core diameter: 500 μm
      Clad diameter: 625 μm
      NA: 0.22
      The length of a pitch: approximately 8.6 mm
      The length of the first GI fiber:
         4.62 mm (sample A)
         4.62 mm (sample B)
         4.41 mm (sample C)

Figure 3:
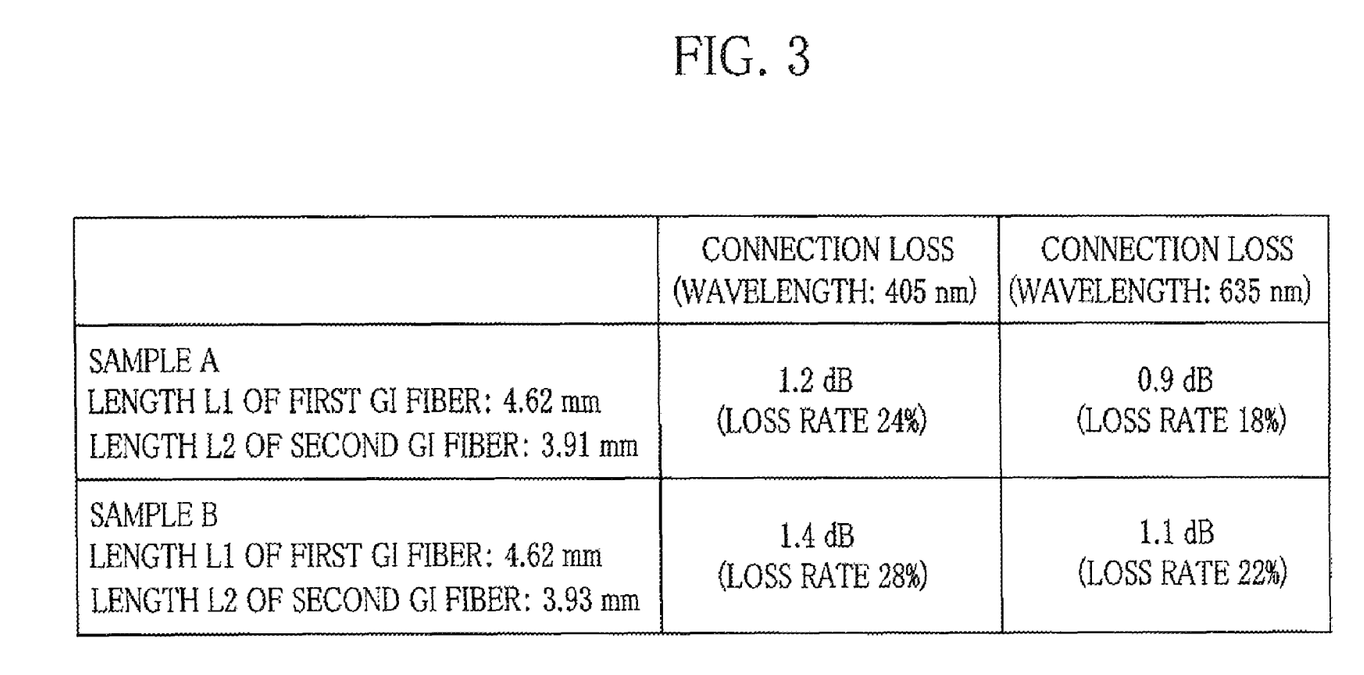
FIG. 3 is a table showing evaluation results of connection losses of samples A and B.

4.62 mm (sample D)
The length of the second GI fiber:
3.91 mm (sample A)
3.93 mm (sample B)
3.6 to 4.41 mm (sample C)
3.6 to 4.62 mm (sample D)
Third and fourth ferrules: zirconia ferrules having a diameter of 2.5 mm
Adhesive: thermosetting epoxy
Gap G: 1.0 to 1.5 mm
[First and Second Sleeves]
Metal split sleeves
[Connection Sleeve]
Metal split sleeve
[Laser Light]
Wavelengths: 405 nm and 635 nm
Output power: 1 to 0.1 mW A table of FIG. 3 shows evaluation results of samples A and B. As is apparent from this table, connection losses by the optical fiber connector 10 according to the present invention were small, from 0.9 to 1.4 dB (loss rate of 18 to 28%). It is conceivable that the difference in the connection losses between the samples A and B was caused by the difference in PC contact states between the first optical fiber 11 and the first GI fiber 24, and between the second optical fiber 12 and the second GI fiber 34. When the ferrules 15 and 19 and the stubs 16 and 18 were inclined by several degrees in coupling positions between the first sleeve 17 and the connection sleeve 21 and between the connection sleeve 21 and the second sleeve 20, the connection losses hardly increased. Furthermore, in the case of substituting sleeves of zirconia for the first sleeve 17, the second sleeve 20, and the connection sleeve 21, similar low connection losses were measured.

Figure 4:
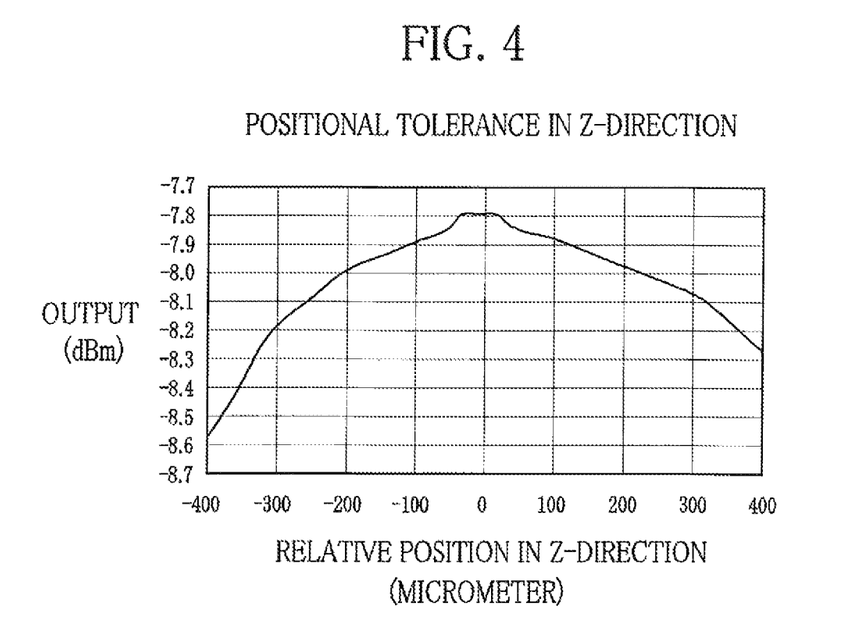
FIG. 4 is a graph showing variation in output of laser light from a second optical fiber, when the relative position between the first fiber stub and the second fiber stub is varied in an optical axis direction.
Figure 5:
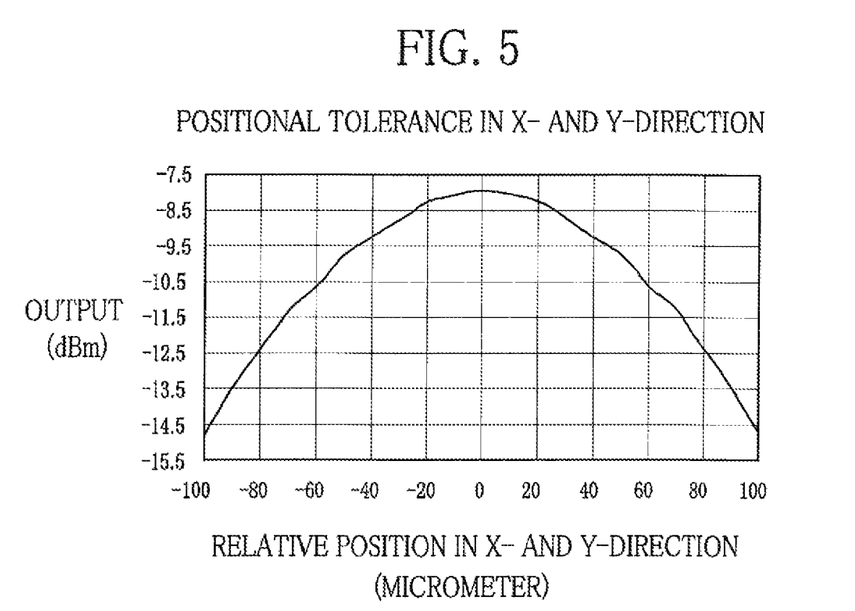
FIG. 5 is a graph showing variation in output of the laser light from the second optical fiber, when the relative position between the first fiber stub and the second fiber stub is varied in a direction orthogonal to the optical axis direction.

FIG. 4 shows variation in laser light intensity outputted from the second optical fiber 12, when the relative position between the first fiber stub 16 and the second fiber stub 18 is shifted in the optical axis direction (Z-direction). FIG. 5 shows variation in the laser light intensity outputted from the second optical fiber 12, when the relative position between the first fiber stub 16 and the second fiber stub 18 is shifted in an X-direction and a Y-direction that are orthogonal to the Z-direction. In the Z-direction, a positive direction refers to a direction to which the first and second fiber stubs 16 and 18 get near to each other. In FIG. 5, the Z-directional relative position between the first and second fiber stubs 16 and 18 is zero. The graphs of FIGS. 4 and 5 show measurement results on conditions that the lengths of the first and second fiber stubs 16 and 18 are 4.0 to 4.6 mm, a Z-directional regular width of ±100 µm, and X-directional and Y-directional regular widths of ±20 µm.

As is apparent from FIGS. 4 and 5, reduction in the output of the laser light intensity with respect to the shift of the relative position between the first and second fiber stubs 16 and 18 is relatively small. Accordingly, the optical fiber connector 10 of the present invention has high tolerance, and maintains a low connection loss, even if the relative position between the first and second fiber stubs 16 and 18 is shifted.

By setting the core diameter of the first GI fiber 24 at 500 µm, as with the samples A and B described above, the beam diameter (105 µm) of the laser light transmitted through the first optical fiber 11 are enlarged at approximately five times. Thus, the optical power density at the light exit end of the first GI fiber 24 becomes one twenty-fifth ($\frac{1}{25}$) of the optical power density at the front end of the first optical fiber 11. Therefore, if the optical power density at the light exit end of the first GI fiber 24 is 15 W/mm², which is a maximum allowable density for prevention of the dust collection effect, laser light of 3 W is transmittable. As a result, the optical fiber connector 10 according to the present invention is applicable to a high-intensity laser light unit.

The core diameters of the GI fibers used in the first and second fiber stubs 16 and 18 may be five or more times larger than the core diameter of the first optical fiber 11. Taking an optical fiber connector that uses GI fibers having a core diameter of 1000 µm and a clad diameter of 1250 µm connects the first and second optical fibers 11 and 12 as an example, similar results to the samples A and B were obtained, when the lengths of the first and second fiber stubs 16 and 18 were made at approximately 9 mm. In the case of using ferrules of a standard size (for example, a diameter of 2.5 mm or 1.25 mm), the outside diameter of the GI fibers is preferably 1000 µm or less.

The samples C and D were made to evaluate connection losses in accordance with variation in the length of the second fiber stub 18. A graph of FIG. 6 shows the connection losses of the samples C and D in transmitting the laser light of 405 nm therethrough.

Figure 6:
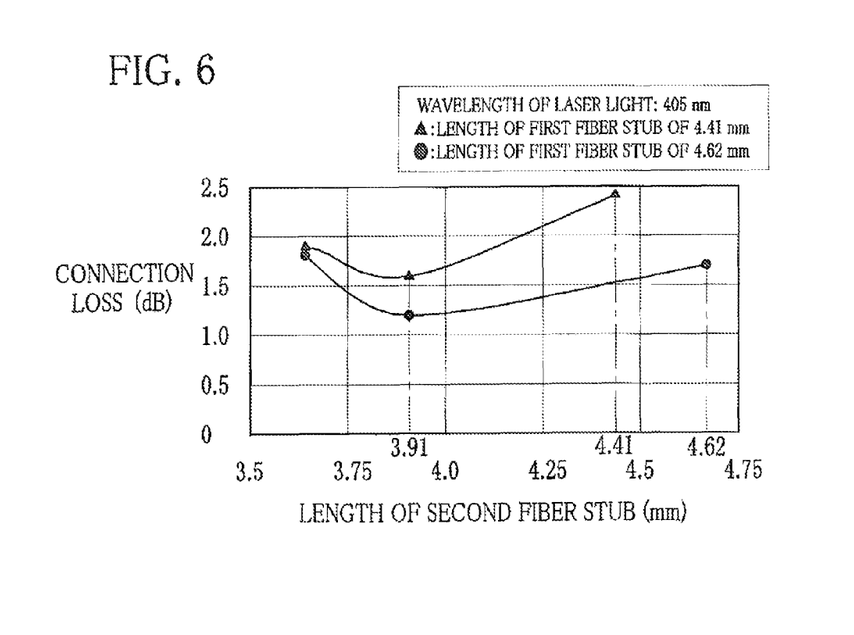
FIG. 6 is a graph showing variation in connection losses depending on the length of the second fiber stub in transmission of the laser light of 405 nm.

As shown in FIG. 6, when the length L1 of the first fiber stub 16 and the length L2 of the second fiber stub 18 were equally 4.62 mm, the sum total of the lengths L1 and L2 was longer than ½ pitch by approximately 10%, and there was a connection loss of approximately 1.7 dB. On the contrary, when the length L2 of the second fiber stub 18 was 3.91 mm while the length L1 of the first fiber stub 16 was still 4.62 mm, the sum total of the lengths L1 and L2 was approximately equal to ½ pitch, and the connection loss was reduced to approximately 1.2 dB. Besides, too short length L2 of the second fiber stub 18 relative to the length L1 of the first fiber stub 16 also caused increase in the connection loss.

Figure 7:
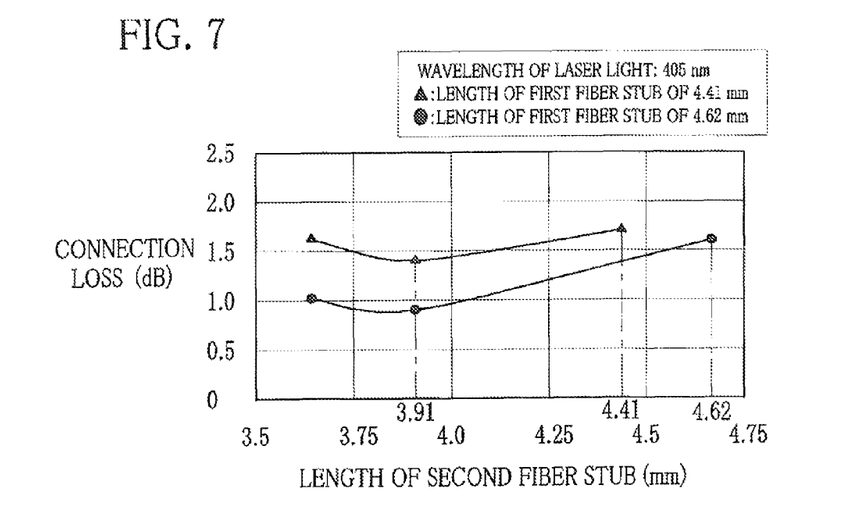
FIG. 7 is a graph showing variation in connection losses depending on the length of the second fiber stub in transmission of the laser light of 635 nm.

The same relation between the fiber lengths L1 and L2 and the connection loss as described above held in the case of the length L1 of the first fiber stub 16 being 4.41 mm, and in the case of transmitting the laser light of 635 nm as shown in FIG. 7. When the length L1 of the first fiber stub 16 was 3.91 mm and the length L2 of the second fiber stub 18 was 4.62 mm, there was a connection loss of several dB, though this was not listed in a table.

From evaluation results described above, it is preferable that the length L1 of the first fiber stub 16 and the length L2 of the second fiber stub 18 satisfy the following expressions (1) and (2):

$$L1+L2=\tfrac{1}{2}\ \text{pitch} \tag{1}$$

$$L1 \geq L2 \cong 0.7 \times L1 \tag{2}$$

The optical fiber connector 10 according to the present invention is suitable for connection of the optical fibers that are frequently attached and detached, and thus is applicable to, for example, an endoscope system using a laser light source unit. The endoscope system using the optical fiber connector 10 according to the present invention will be described with referring to FIG. 8. The same reference numerals denote the same components as the above embodiment, and detailed description thereof will be omitted.

Figure 8:
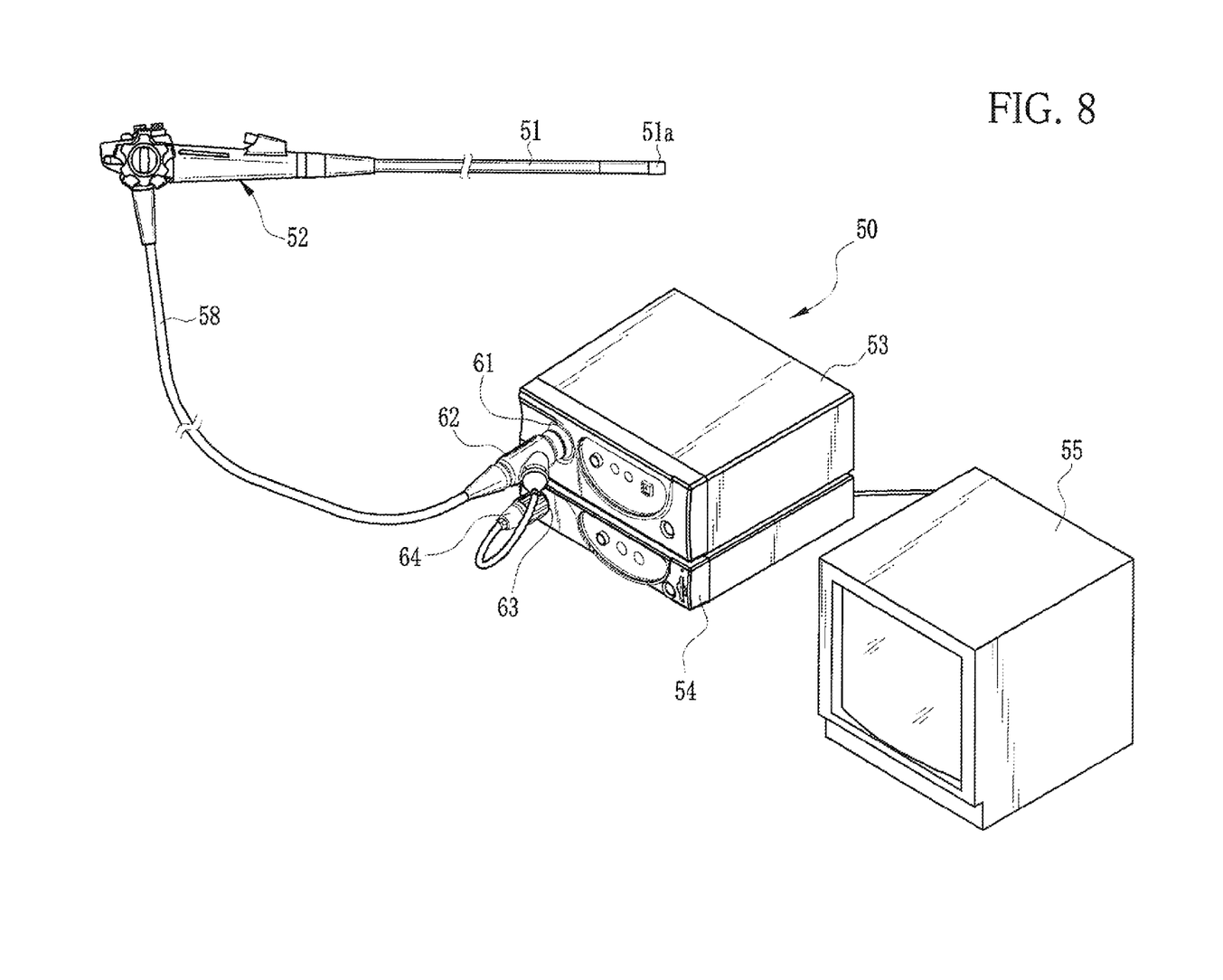
FIG. 8 is a perspective view of an endoscope system using the optical fiber connector.

An endoscope system 50 is constituted of an endoscope 52 for imaging the inside of a human body by an insertion section 51 introduced into the body, a light source unit 53 for providing the endoscope 52 with laser light for lighting, a processor unit 54 for processing an image captured by the endoscope 52, and a monitor 55 for displaying the image processed by the processor unit 54.

The endoscope 52 is provided with a universal cord 58, which is connected to the light source unit 53 and the processor unit 54. A communication cable is inserted through the universal cord 58 to send an image signal from an image sensor provided at a distal portion 51a of the insert section 51 to the processor unit 54. The above described second optical fiber 12 is routed through the insertion section 51 and the universal cord 58. The front end of the second optical fiber 12 is connected to a phosphor in the distal end 51a of the insertion section 51.

An end of the universal cord 58 is provided with a light source connector 62, which is detachably connected to a socket 61 of the light source unit 53. From the light source connector 62, a processor connector 64 is branched to connect the communication cable to the processor unit 54 via a socket 63.

The socket 61 of the light source unit 53 contains the first optical fiber 11, the first ferrule 15, the first fiber stub 16, the first sleeve 17, and the connection sleeve 21, all of which are described above. The first optical fiber 11 is connected to a laser module in the light source unit 53. The light source connector 62 contains the second fiber stub 18, the second ferrule 19, the second optical fiber 12, and the second sleeve 20. Thus, the socket 61 and the light source connector 62 compose the optical fiber connector 10 of the present invention. By plugging the light source connector 62 into the socket 61, the optical fiber connector 10 is connected.

The laser light emitted from the laser module in the light source unit 53 is transmitted through the universal cord 58 via the optical fiber connector 10 that is composed of the socket 61 and the light source connector 62. The laser light exits from the front end of the second optical fiber 12 at the distal end 51a of the insertion section 51, and excites the phosphor to generate illumination light. Accordingly, it is possible to obtain the illumination light of high brightness, as compared with a conventional light source unit using a xenon lamp or the like.

The light source connector 62 is plugged into the socket 61 of the light source unit 53 before use of the endoscope 52, and is unplugged after the use. Thus, this optical fiber connector 10 is frequently connected and disconnected. Conventionally, such a frequently disconnected connector has problems of adhesion of the dust particle to the tip of the optical fiber, the occurrence of the flaw, damage due to adhesion of the optical fibers, and the like. However, the endoscope system 50 of this embodiment adopts the optical fiber connector 10 according to the present invention, and hence eliminates these problems.

In the above embodiment, the first and second optical fibers 11 and 12 have the same core diameter, but the optical fiber connector 10 according to the present invention is applicable to the connection of the optical fibers having different core diameters. In this case, the core diameter of the first GI fiber 24 may differ from that of the second GI fiber 34.

Also, an optical fiber connector of the invention can be used with other devices for diagnosis, such as a fiberscope, laser optical fiber probe and the like, and with devices for treatment, such as a laser catheter, laser surgical device, laser treatment apparatus and the like.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An optical fiber connector for connecting a first optical fiber to a second optical fiber comprising:
   a first graded-index fiber detachably attached to a light exit end of the first optical fiber, for enlarging a beam diameter of a light incident from the first optical fiber and producing the collimated light; and
   a second graded-index fiber detachably attached to a light entry end of the second optical fiber, for reducing the beam diameter of the collimated light incident from the first graded-index fiber and leading the converging light into the second optical fiber,
   wherein, the first graded-index fiber and the second graded-index fiber satisfy following expressions:

$$L1 \geq L2$$

$$L1 + L2 \approx \tfrac{1}{2}\ \text{pitch}$$

wherein, L1 represents a length of the first graded-index fiber, L2 represents a length of the second graded-index fiber, and one pitch represents a single sinusoidal period of an optical path of the light transmitted through the first graded-index fiber.

2. The optical fiber connector according to claim 1, wherein each of the first optical fiber and the second optical fiber is a multimode fiber having a core diameter of 100 μm or more.

3. The optical fiber connector according to claim 2, wherein the first optical fiber and the second optical fiber transmit the light having an optical power of 100 mW or more.

4. The optical fiber connector according to claim 1, wherein the first graded-index fiber and the second graded-index fiber are disposed so as to align central axes of cores with each other.

5. The optical fiber connector according to claim 4, wherein the first graded-index fiber and the second graded-index fiber are disposed across a predetermined gap.

6. The optical fiber connector according to claim 5, wherein the predetermined gap is 50 μm or more.

7. The optical fiber connector according to claim 6, wherein the first graded-index fiber and the second graded-index fiber further satisfy a following expression:

$$L1 \times 0.7 \leq L2 \leq L1.$$

8. The optical fiber connector according to claim 7, wherein the light contains at least one wavelength component between 405 nm and 635 nm inclusive.

9. The optical fiber connector according to claim 7, wherein a core diameter of the first graded-index fiber is three or more times larger than that of the first optical fiber, and a core diameter of the second graded-index fiber is equal to or larger than that of the first graded-index fiber.

10. The optical fiber connector according to claim 7, wherein the first graded-index fiber and the second graded-index fiber further satisfy following expressions:

$$3\ \text{mm} \leq L1 \leq 10\ \text{mm}$$

$$3\ \text{mm} \leq L2 \leq 10\ \text{mm}.$$

11. The optical fiber connector according to claim 1, further comprising:
    a first anti-reflection film disposed at a light exit end of the first graded-index fiber, the first anti-reflection film having a topmost layer containing fluoride; and
    a second anti-reflection film disposed at a light entry end of the second graded-index fiber, the second anti-reflection film having a topmost layer containing fluoride.

12. The optical fiber connector according to claim 11, further comprising:
    a first fluoride film disposed at a light entry end of the first graded-index fiber; and a second fluoride film disposed at a light exit end of the second graded-index fiber.

13. The optical fiber connector according to claim 12, further comprising:
- a first ferrule attached to an end portion of the first optical fiber, the light exit end of the first optical fiber being exposed from an end of the first ferrule;
- a second ferrule attached to an end portion of the second optical fiber, the light entry end of the second optical fiber being exposed from an end of the second ferrule;
- a third ferrule for covering the first graded-index fiber, the light entry end of the first graded-index fiber being exposed from an end of the third ferrule, and the light exit end of the first graded-index fiber being exposed from the other end of the third ferrule;
- a fourth ferrule for covering the second graded-index fiber, the light entry end of the second graded-index fiber being exposed from an end of the fourth ferrule, and the light exit end of the second graded-index fiber being exposed from the other end of the fourth ferrule;
- a first sleeve for holding the first ferrule and the third ferrule so that the light exit end of the first optical fiber keeps contact with the light entry end of the first graded-index fiber;
- a second sleeve for holding the second ferrule and the fourth ferrule so that the light entry end of the second optical fiber keeps contact with the light exit end of the second graded-index fiber; and
- a connection sleeve for holding the third ferrule and the fourth ferrule so that the light exit end of the first graded-index fiber concentrically faces to the light entry end of the second graded-index fiber across a predetermined gap.

14. An endoscope system comprising:
- an endoscope having a slender insertion section, a light exit side optical fiber being routed through the insertion section to transmit a light for lighting an object to be imaged;
- a light source unit having a light source for emitting the light and a light entry side optical fiber for transmitting the light from the light source; and
- an optical fiber connector for connecting a light exit end of the light entry side optical fiber to a light entry end of the light exit side optical fiber, the optical fiber connector including:
- a first graded-index fiber detachably attached to the light exit end of the light entry side optical fiber, for enlarging a beam diameter of the light incident from the light entry side optical fiber and producing the collimated light; and
- a second graded-index fiber detachably attached to the light entry end of the light exit side optical fiber, for reducing the beam diameter of the collimated light incident from the first graded-index fiber and leading the converging light into the light exit side optical fiber,
wherein, the first graded-index fiber and the second graded-index fiber satisfy following expressions:

$$L1 \geq L2$$

$$L1 + L2 \cong \tfrac{1}{2} \text{ pitch}$$

wherein, L1 represents a length of the first graded-index fiber, L2 represents a length of the second graded-index fiber, and one pitch represents a single sinusoidal period of an optical path of the light transmitted through the first graded-index fiber.

* * * * *